US012810770B2

(12) United States Patent
Chang et al.

(10) Patent No.: US 12,810,770 B2
(45) Date of Patent: Nov. 24, 2026

(54) METHOD, ELECTRONIC DEVICE, AND DISPLAY DEVICE FOR SUPPRESSING BRIGHTNESS OF DISPLAY DEVICE

(71) Applicant: GIGA-BYTE TECHNOLOGY CO., LTD., New Taipei City (TW)

(72) Inventors: Kuei-Shan Chang, New Taipei City (TW); Shih-Chieh Chou, New Taipei City (TW); Bo Yang, New Taipei City (TW); Shengchun Ding, New Taipei City (TW); Xiaocheng Li, New Taipei City (TW); Bin Liu, New Taipei City (TW); Guangsheng Qu, New Taipei City (TW); Shu-Cheng Wu, New Taipei City (TW)

(73) Assignee: GIGA-BYTE TECHNOLOGY CO., LTD., New Taipei City (TW)

( * ) Notice: Subject to any disclaimer, the term of this patent is extended or adjusted under 35 U.S.C. 154(b) by 0 days.

(21) Appl. No.: 19/270,490

(22) Filed: Jul. 16, 2025

(65) Prior Publication Data

US 2026/0057820 A1 Feb. 26, 2026

(30) Foreign Application Priority Data

Aug. 20, 2024 (TW) ................................ 113131215

(51) Int. Cl.

| | |
|---|---|
| ***G09G 3/20*** | (2006.01) |
| ***A63F 13/28*** | (2014.01) |
| ***A63F 13/837*** | (2014.01) |
| ***G06T 7/90*** | (2017.01) |
| ***G06V 10/82*** | (2022.01) |

(52) U.S. Cl.

CPC ........... *G09G 3/2096* (2013.01); *A63F 13/28* (2014.09); *A63F 13/837* (2014.09); *G06T 7/90* (2017.01);

(Continued)

(58) Field of Classification Search

CPC ......... G09G 3/2096; G09G 2320/0257; G09G 2320/0626; G09G 2320/103;

(Continued)

(56) References Cited

U.S. PATENT DOCUMENTS

| | | | | |
|---|---|---|---|---|
| 9,449,252 | B1 * | 9/2016 | Usikov .................... | H04N 1/60 |
| 2009/0231354 | A1 * | 9/2009 | Blaut ..................... | H05B 45/22 345/589 |

(Continued)

FOREIGN PATENT DOCUMENTS

| | | |
|---|---|---|
| CN | 116704927 | 9/2023 |
| JP | 2006154452 | 6/2006 |

(Continued)

OTHER PUBLICATIONS

"Search Report of Europe counterpart Application", issued on Oct. 16, 2025, p. 1-p. 12.

(Continued)

*Primary Examiner* — Rodney Amadiz
(74) *Attorney, Agent, or Firm* — JCIPRNET

(57) ABSTRACT

A method, an electronic device, and a display device for suppressing a brightness of the display device are provided. The method includes the following. An image signal is received. The image signal is detected to determine whether a trigger event occurs. Also, in response to the trigger event occurring, the brightness of an output image of the display device is suppressed, in which the display device generates the output image according to the image signal.

17 Claims, 7 Drawing Sheets

(52) U.S. Cl.
CPC .... *G06V 10/82* (2022.01); *G06T 2207/10024* (2013.01); *G06T 2207/20084* (2013.01); *G06T 2207/30212* (2013.01); *G09G 2320/0257* (2013.01); *G09G 2320/0626* (2013.01); *G09G 2320/103* (2013.01); *G09G 2360/16* (2013.01)

(58) Field of Classification Search
CPC ... G09G 2360/16; A63F 13/28; A63F 13/837; G06T 7/90; G06T 2207/10024; G06T 2207/20084; G06T 2207/30212; G06V 10/82
See application file for complete search history.

(56) References Cited

U.S. PATENT DOCUMENTS

| | | | | |
|---|---|---|---|---|
| 2011/0205202 | A1* | 8/2011 | Son | G09G 3/3208 345/207 |
| 2014/0146066 | A1 | 5/2014 | Kang et al. | |
| 2016/0217731 | A1* | 7/2016 | Joo | G09G 3/3208 |
| 2016/0291681 | A1* | 10/2016 | Worthington | G06F 1/3265 |
| 2019/0235247 | A1 | 8/2019 | Norden | |
| 2020/0066217 | A1* | 2/2020 | Kang | G09G 3/3666 |
| 2020/0192548 | A1* | 6/2020 | Glen | G09G 5/08 |
| 2023/0048429 | A1 | 2/2023 | Song et al. | |
| 2023/0282181 | A1 | 9/2023 | Muse et al. | |

FOREIGN PATENT DOCUMENTS

| | | |
|---|---|---|
| JP | 2023114017 | 8/2023 |
| TW | 202316179 | 4/2023 |

OTHER PUBLICATIONS

"Notice of Reasons for Refusal of Japan Counterpart Application", issued on Feb. 3, 2026, p. 1-p. 4.

* cited by examiner

METHOD, ELECTRONIC DEVICE, AND DISPLAY DEVICE FOR SUPPRESSING BRIGHTNESS OF DISPLAY DEVICE

CROSS-REFERENCE TO RELATED APPLICATION

This application claims the priority benefit of Taiwan application serial no. 113131215, filed on Aug. 20, 2024. The entirety of the above-mentioned patent application is hereby incorporated by reference herein and made a part of this specification.

BACKGROUND

Technical Field

The disclosure relates to a display technology, and particularly relates to a method for suppressing a brightness of a display device, an electronic device, and a display device.

Related Art

In shooting games, when a character controlled by a player is hit by a flashbang, the screen displays a high-brightness visual effect on the screen to simulate the visual impact of the flashbang. This visual effect usually causes discomfort to players. On the other hand, when the effect of the flashbang disappears, the pupils of the player may not have returned to normal, making it difficult for the player to respond to the game screen in time, thereby affecting the win rate and gaming experience of the player.

SUMMARY

The disclosure provides a method, an electronic device, and a display device for suppressing a brightness of the display device, which may reduce negative impact caused by flash visual effects on players.

A display device of the disclosure includes a display module, a bridge chip, a processor, and a display controller. The bridge chip receives an image signal. The processor is electrically connected to the bridge chip. The display controller is electrically connected to the processor and the display module, in which the processor detects the image signal to determine whether a trigger event occurs, in which in response to the trigger event occurring, the display controller suppresses a brightness of an output image of the display module, in which the display controller generates the output image according to the image signal.

In an embodiment of the disclosure, the processor inputs the image signal to a machine learning model to generate a detection result, in which the processor determines whether the trigger event occurs according to the detection result.

In an embodiment of the disclosure, the processor compares an average color parameter of the image signal with a threshold to generate a detection result, in which the processor determines whether the trigger event occurs according to the detection result.

In an embodiment of the disclosure, in response to the average color parameter being greater than the threshold, the processor generates the detection result indicating occurrence of the trigger event.

In an embodiment of the disclosure, the display module outputs an on-screen display interface, in which the processor detects the image signal according to an operation command corresponding to the display interface on the screen.

In an embodiment of the disclosure, the processor performs object recognition on the image signal to obtain a recognition result, and detects the image signal according to the recognition result.

In an embodiment of the disclosure, the processor performs object recognition by using a regional convolutional neural network, in which the regional convolutional neural network includes a region proposal network.

In an embodiment of the disclosure, the processor detects the image signal to determine whether the trigger event is ended, in which in response to the trigger event ending, the display controller stops suppressing the brightness of the output image.

An electronic device for suppressing a brightness of a display device according to the disclosure includes a transceiver and a processor. The transceiver is communicatively connected to the display device. The processor is electrically connected to the transceiver and is configured to perform the following. An image signal is received through the transceiver. The image signal is detected to determine whether a trigger event occurs. Also, in response to the trigger event occurring, a brightness of an output image of the display device is suppressed, in which the display device generates the output image according to the image signal.

In an embodiment of the disclosure, the processor inputs the image signal to a machine learning model to generate a detection result, and determines whether the trigger event occurs according to the detection result.

In an embodiment of the disclosure, the processor compares an average color parameter of the image signal with a threshold to generate a detection result, and determines whether the trigger event occurs according to the detection result.

In an embodiment of the disclosure, in response to the average color parameter being greater than the threshold, the processor generates the detection result indicating occurrence of the trigger event.

In an embodiment of the disclosure, the processor detects whether an application program is executed, in which in response to the application program being executed, the processor detects the image signal.

In an embodiment of the disclosure, the processor performs object recognition on the image signal to obtain a recognition result, and detects the image signal according to the recognition result.

In an embodiment of the disclosure, the processor performs object recognition by using a regional convolutional neural network, in which the regional convolutional neural network includes a region proposal network.

In an embodiment of the disclosure, the processor detects the image signal to determine whether the trigger event is ended, in which in response to the trigger event ending, the processor stops suppressing the brightness of the output image.

A method for suppressing a brightness of a display device according to the disclosure includes the following. An image signal is received. The image signal is detected to determine whether a trigger event occurs. Also, in response to the trigger event occurring, the brightness of an output image of the display device is suppressed, in which the display device generates the output image according to the image signal.

Based on the above, the device and method of the disclosure may suppress the brightness of the display device when the display device displays flash visual effects, thereby reducing negative impact caused by flash visual effects on users.

DESCRIPTION OF THE EMBODIMENTS

Figure 1:
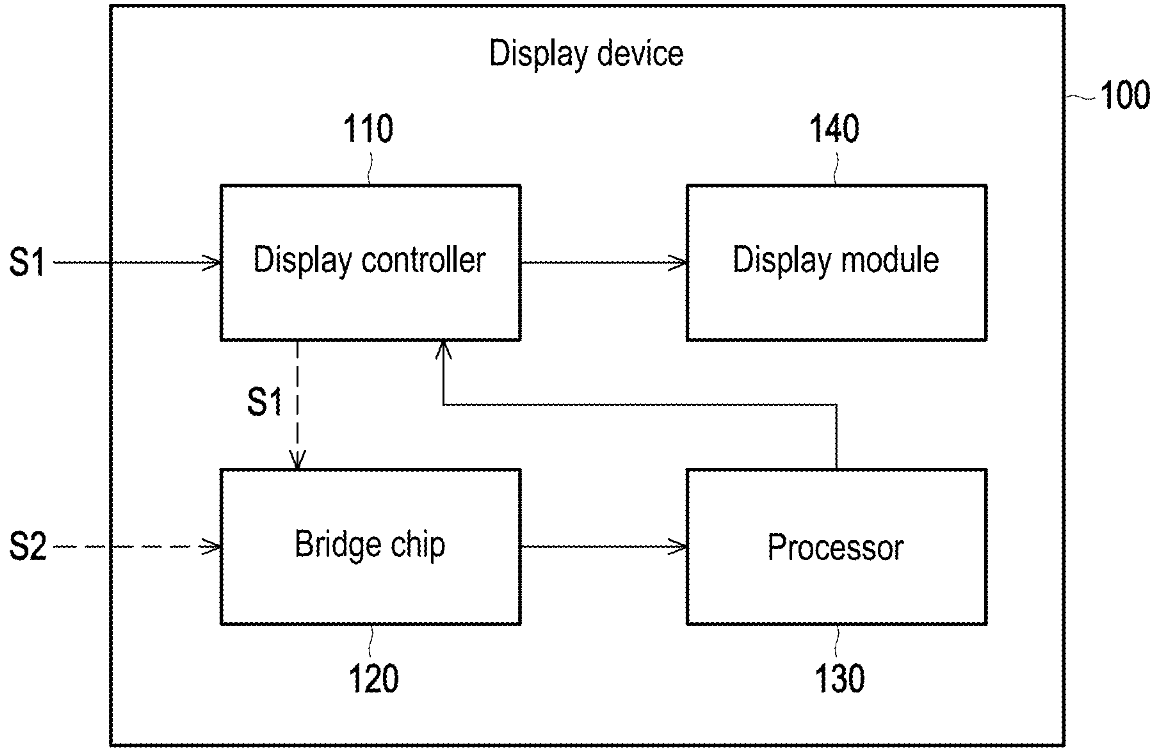
FIG. 1 illustrates a schematic diagram of a display device according to an embodiment of the disclosure.

FIG. 1 illustrates a schematic diagram of a display device 100 according to an embodiment of the disclosure. A user may enable or disable various functions provided by the display device 100 by operating an on-screen display (OSD) interface provided by the display device 100. The display device 100 may include a display controller 110, a bridge chip 120, a processor 130, and a display module 140. The display controller 110 is, for example, a scaler. The processor 130 is, for example, an artificial intelligence chip.

The display controller 110 or processor 130 is, for example, a central processing unit (CPU), or other programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar components or combinations of the above components. The display controller 110 may be electrically connected to the processor 130 and the display module 140. In an embodiment, the display controller 110 may be further electrically connected to the bridge chip 120. The display controller 110 may be configured to control the bridge chip 120, the processor 130, or the display module 140.

The display module 140 may include a liquid-crystal display panel, a light-emitting diode (LED) display panel, a vacuum fluorescent display panel, a plasma display panel (PDP), an organic light-emitting diode (OLED) display panel, or a field-emission display panel.

Figure 3:
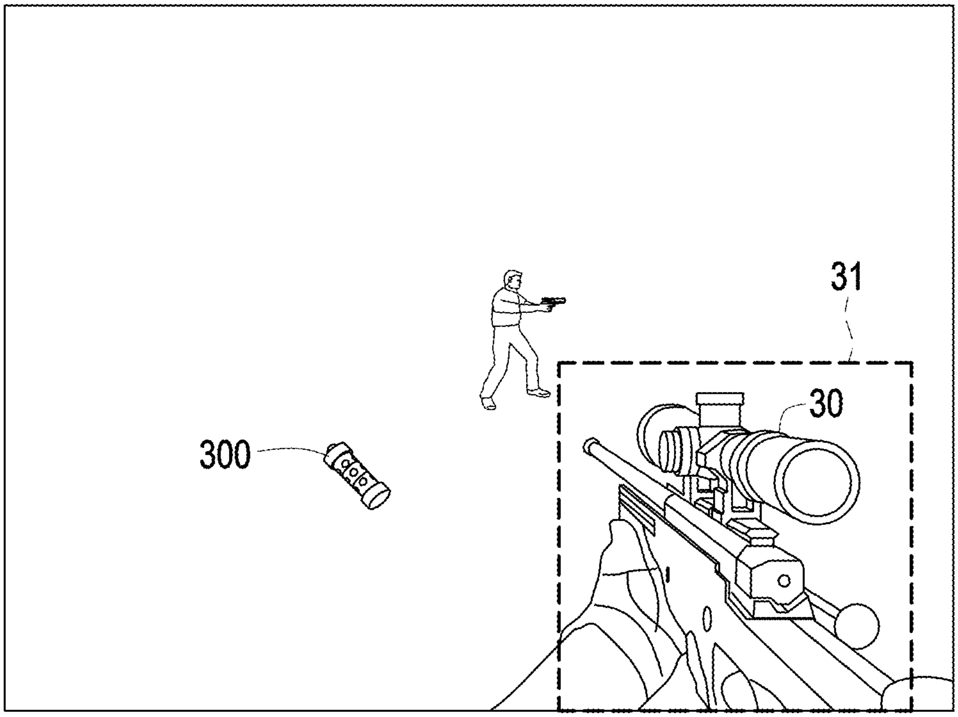
FIG. 3 illustrates a schematic diagram of a recognition result of object recognition according to an embodiment of the disclosure.

The display device 100 may have a brightness suppression function, in which the brightness suppression function may suppress a brightness of the display device 100 when the display device 100 detects that a trigger event occurs (for example, a virtual character manipulated by a user in a shooting game is attacked by a flashbang, such as a flashbang 300 shown in FIG. 3).

In an embodiment, the display module 140 may output an OSD interface for user operation. The processor 130 may enable the brightness suppression function of the display device 100 according to operation commands corresponding to the OSD interface.

In an embodiment, the processor 130 may perform object recognition on an image signal obtained by the display device 100 to obtain a recognition result, and determine whether to enable the brightness suppression function of the display device 100 according to the recognition result.

Figure 2:
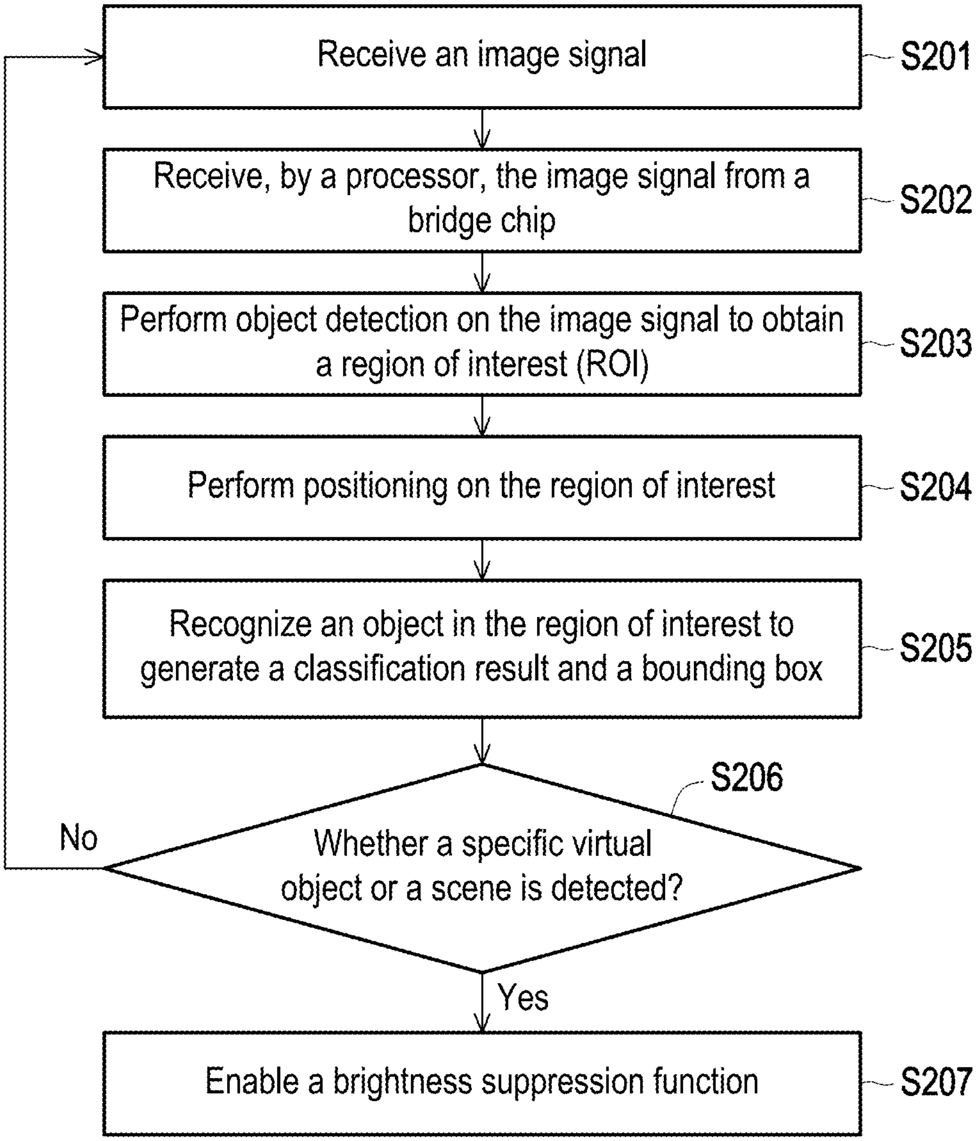
FIG. 2 illustrates a flowchart of enabling a brightness suppression function of the display device according to an embodiment of the disclosure.

FIG. 2 illustrates a flowchart of enabling the brightness suppression function of the display device according to an embodiment of the disclosure, in which the process in FIG. 2 may be applied to the display device 100. In Step S201, the bridge chip 120 may receive an image signal. The image signal includes, for example, game graphics of a game application program. Specifically, the bridge chip 120 is, for example, an integrated circuit. The display device 100 may be communicatively connected to an external device (for example, a personal computer or a game console) running the game application program. The bridge chip 120 may receive the image signal from the external device.

In an embodiment, the bridge chip 120 may have a communication interface. The bridge chip 120 may be communicatively connected to an external device through the communication interface to directly receive the image signal from the external device, such as a signal S2 shown in FIG. 1. The communication interface of the bridge chip 120 may support communication protocols such as universal serial bus (USB), high definition multimedia interface (HDMI), or DisplayPort (DP).

In an embodiment, the display controller 110 may have a communication interface. The display controller 110 may be communicatively connected to an external device through the communication interface to receive the image signal from the external device, such as a signal S1 shown in FIG. 1. The communication interface of the display controller 110 may support communication protocols such as USB, HDMI, or DP. The display controller 110 may forward the image signal to the bridge chip 120 through a DP out function. That is, the bridge chip 120 may indirectly receive the image signal from the external device through the display controller 110.

In Step S202, the processor 130 may receive the image signal from the bridge chip 120.

In Step S203 to Step S205, the processor 130 may use a machine learning model to perform object detection on the game screen to obtain the recognition result. The machine learning model used by the processor 130 includes, for example, a regional convolutional neural network (R-CNN). The processor 130 may train the machine learning model according to multiple pieces of training data. In an embodiment, the training data may include images of game screens or non-game screens, and may include labels indicating whether the images belong to game screens or non-game screens. In an embodiment, the training data may include images displaying or not displaying virtual objects, and may include labels indicating whether the images contain virtual objects.

Specifically, in Step S203, the processor 130 may perform object detection on the image signal to obtain one or more regions of interest (ROI). The regions of interest include, for example, virtual items in game applications or point of view (POV) containing virtual characters. In an embodiment, the processor 130 may generate one or more regions of interest through a region proposal network (RPN) included in the regional convolutional neural network.

In Step S204, the processor 130 may perform positioning on the regions of interest to obtain position information (for example, coordinates) of the regions of interest.

In Step S205, the processor 130 may recognize objects in the regions of interest to generate recognition results including classification results of the objects and bounding boxes.

Taking FIG. 3 as an example, FIG. 3 illustrates a schematic diagram of a recognition result of object detection according to an embodiment of the disclosure. The processor 130 may perform object detection on the game screen (or the image signal) to recognize a virtual item 30, and generate a bounding box 31 corresponding to the virtual item 30.

Returning to FIG. 2, in Step S206, the processor 130 may determine whether a specific virtual object (for example, the virtual object 30) or a scene is detected according to the recognition result. If the processor 130 determines that a specific virtual object or scene is detected, then in Step S207, the processor 130 may enable the brightness suppression function of the display device 100. On the other hand, if the processor 130 determines that no specific virtual object or scene is detected, then the processor 130 may re-execute Step S201 after a period of time.

Figure 4:
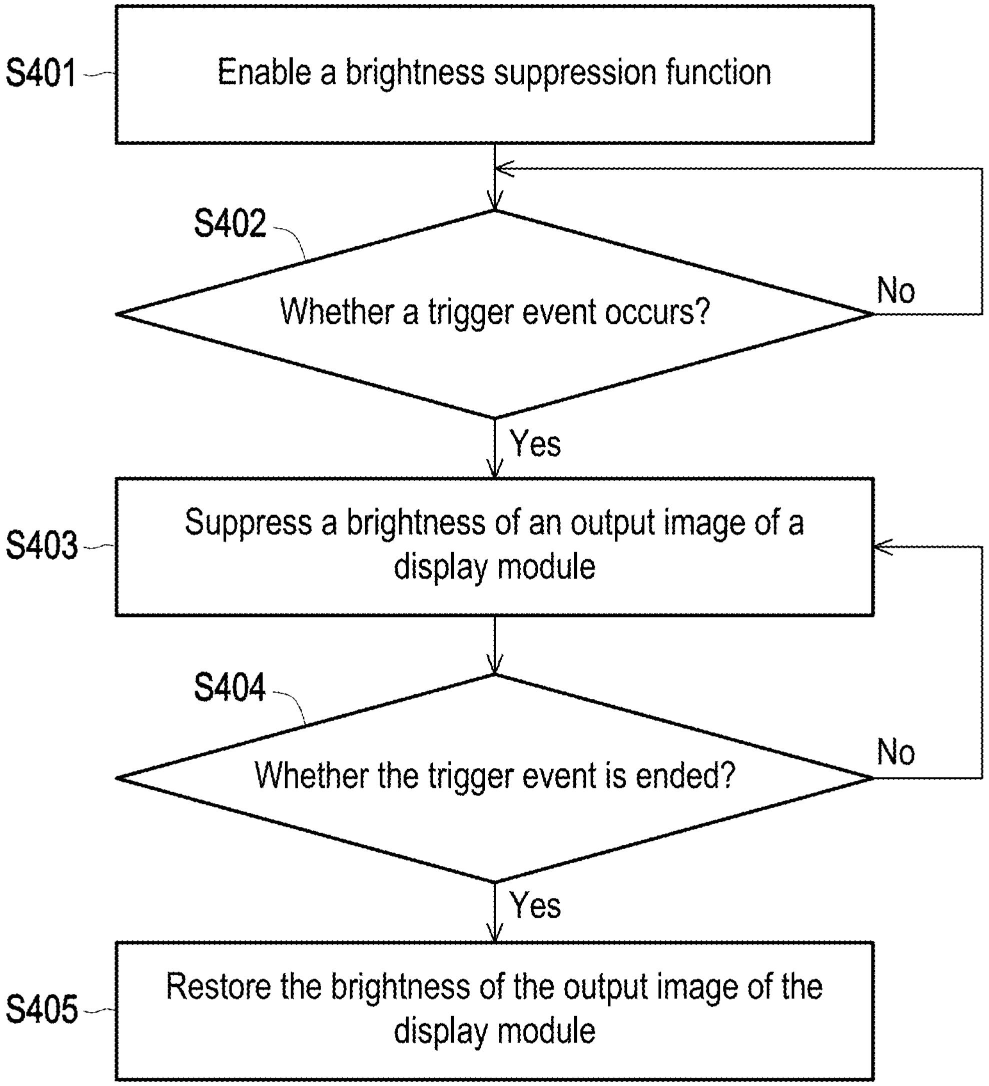
FIG. 4 illustrates a flowchart of the brightness suppression function of the display device according to an embodiment of the disclosure.

FIG. 4 illustrates a flowchart of the brightness suppression function of the display device 100 according to an embodiment of the disclosure, in which the process in FIG. 4 may be applied to the display device 100. In Step S401, the processor 130 enables the brightness suppression function of the display device 100.

In Step S402, the processor 130 may start to detect the image signal received by the bridge chip 120. The processor 130 may detect the image signal to generate the detection result, and determine whether a trigger event occurs according to the detection result. The trigger event includes, for example, a virtual character controlled by the user being attacked by a flashbang in the game application. If the processor 130 determines that a trigger event occurs, then the process proceeds to Step S403. If the processor 130 determines that no trigger event occurs, then the processor 130 may re-execute Step S402 after a period of time.

In an embodiment, the processor 130 may input the image signal to a machine learning model to generate the detection result indicating occurrence or non-occurrence of a trigger event. Specifically, the processor 130 may train the machine learning model according to multiple pieces of training data, in which the machine learning model is, for example, a regional convolutional neural network. In an embodiment, the training data may include images of virtual characters in shooting games being attacked or not being attacked by flashbangs, and may include labels indicating whether the virtual characters in the images are attacked by flashbangs.

In an embodiment, the processor 130 may calculate an average color parameter of the image signal, in which the average color parameter includes, for example, an average of color parameters corresponding to one or more pixels (or one or more display regions) of the image signal. The color parameters include, for example, RGB values. After obtaining the average color parameters of the image signal, the processor 130 may compare the average color parameter with a threshold to generate the detection result indicating occurrence or non-occurrence of a trigger event. For example, if the average color parameter of the image signal is greater than the threshold, then the processor 130 may generate the detection result indicating occurrence of a trigger event. If the average color parameter of the image signal is less than or equal to the threshold, then the processor 130 may generate the detection result indicating non-occurrence of a trigger event.

In Step S403, the processor 130 may transmit the detection result indicating occurrence of a trigger event to the display controller 110. The display controller 110 may suppress the brightness of the output image of the display module 140 according to the command, in which the output image is generated by the display module 140 according to the image signal.

In Step S404, the processor 130 may detect the image signal to determine whether the trigger event is ended. If the processor 130 determines that the trigger event is ended, then the process proceeds to Step S405. If the processor 130 determines that the trigger event is not ended, then the processor 130 may re-execute Step S403 to continuously suppress the brightness of the output image of the display module 140.

In an embodiment, the processor 130 may input the image signal to a machine learning model to generate the detection result indicating whether the trigger event is ended. Specifically, the processor 130 may train the machine learning model according to multiple pieces of training data, in which the machine learning model is, for example, a regional convolutional neural network. In an embodiment, the training data may include images of virtual characters in shooting games being attacked or not being attacked by flashbangs, and may include labels indicating whether the virtual characters in the images are attacked by flashbangs.

In an embodiment, the processor 130 may compare the average color parameter with a threshold to generate the detection result indicating whether the trigger event is ended. For example, if the average color parameter of the image signal is less than or equal to the threshold, then the processor 130 may generate the detection result indicating that the trigger event is ended. If the average color parameter of the image signal is greater than the threshold, then the processor 130 may generate the detection result indicating that the trigger event is not ended.

In Step S405, the processor 130 may transmit a command to the display controller 110. The display controller 110 may restore the brightness of the output image of the display module 140 according to the command, that is, the display controller 110 may stop suppressing the brightness of the output image of the display module 140 according to the command.

Figure 5:
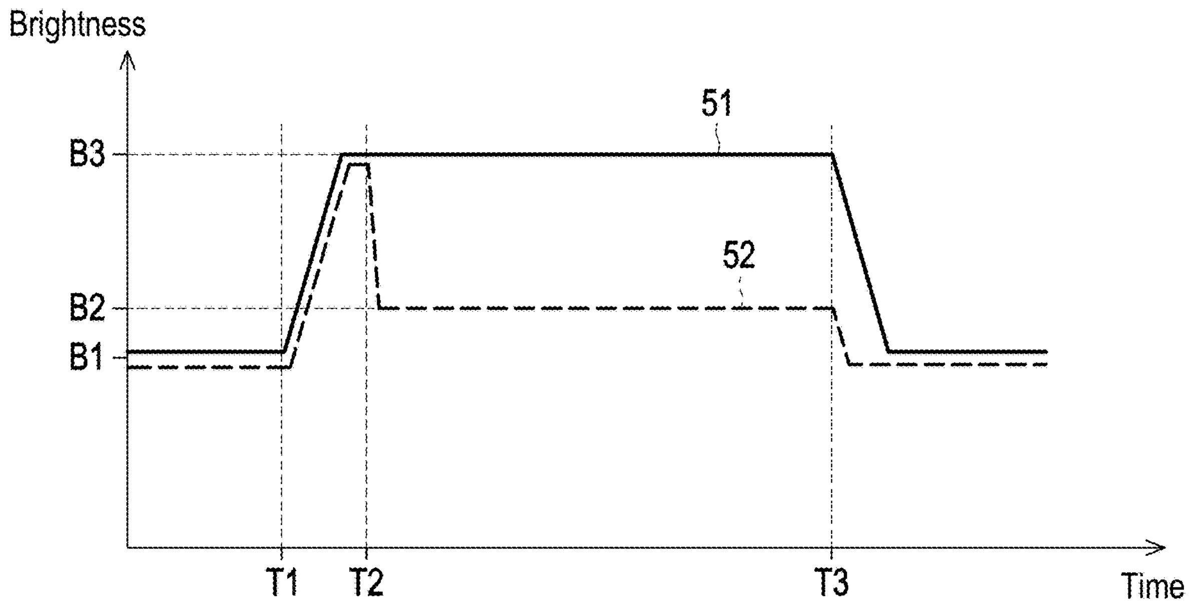
FIG. 5 illustrates a schematic diagram of a brightness of the display device when a trigger event occurs according to an embodiment of the disclosure.

FIG. 5 illustrates a schematic diagram of the brightness of the display device 100 when a trigger event occurs according to an embodiment of the disclosure, in which a line 51 represents the brightness of the display module 140 of the display device 100 without the brightness suppression function enabled during the trigger event, and a line 52 represents the brightness of the display module 140 of the display device 100 with the brightness suppression function enabled during the trigger event.

It is assumed that the trigger event starts at a time point T1 and ends at a time point T3. Taking the line 51 as an example, before the time point T1, the brightness of the output image of the display module 140 is B1. After the trigger event occurs at the time point T1, the brightness of the output image of the display module 140 increases significantly. For example, the brightness of the output image increases from a brightness B1 to a brightness B3 during the period from the time point T1 to the time point T2. Since the display device 100 does not enable the brightness suppression function, the brightness of the output image is not suppressed during the period from the time point T2 to the time point T3 and remains at the brightness B3. The user of the display device 100 may be affected by the high brightness B3 and unable to control the virtual character in the game application in time, or may feel uncomfortable due to the impact of the high brightness B3. After the trigger event ends at the time point T3, the brightness of the output image of the display module 140 recovers from the brightness B3 to the brightness B1.

Taking the line 52 as an example, before the time point T1, the brightness of the output image of the display module 140 is B1. After the trigger event occurs at the time point T1, the brightness of the output image of the display module 140 increases significantly. For example, the brightness of the output image increases from the brightness B1 to the brightness B3 during the period from the time point T1 to the time point T2. Since the display device 100 enables the brightness suppression function, the brightness of the output image is suppressed and reduced to the brightness B2 during the period from the time point T2 to the time point T3. After the trigger event ends at the time point T3, the brightness of the output image of the display module 140 recovers from the brightness B2 to the brightness B1. In this example, the brightness B2 is greater than the brightness B1, but the disclosure is not limited thereto. For example, the brightness B2 may also be equal to the brightness B1.

Figure 6:
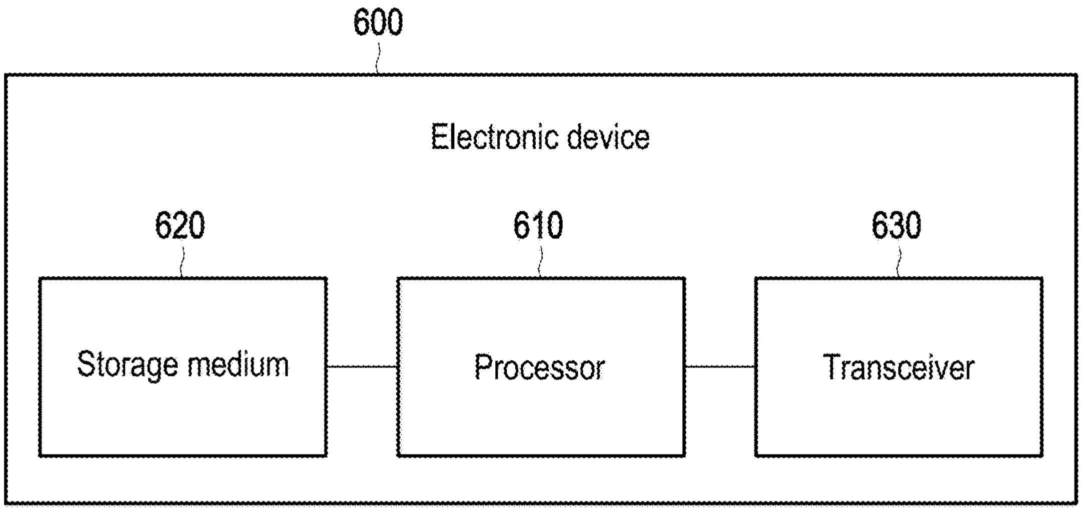
FIG. 6 illustrates a schematic diagram of an electronic device for suppressing the brightness of the display device according to an embodiment of the disclosure.

The various functions of the display device 100 may also be provided by electronic devices such as personal computers or tablet computers. FIG. 6 illustrates a schematic diagram of an electronic device 600 for suppressing the brightness of the display device according to an embodiment of the disclosure. The electronic device 600 may include a processor 610, a storage medium 620, and a transceiver 630.

The processor 610 is, for example, a CPU, or other programmable general-purpose or special-purpose MCU, a microprocessor, a DSP, a programmable display controller, an ASIC, a GPU, an ISP, an IPU, an ALU, a CPLD, an FPGA, or other similar components or combinations of the above components. The processor 610 may be coupled to the storage medium 620 and the transceiver 630, and access and execute multiple modules and various application programs stored in the storage medium 620. The processor 610 may have the same structure or function as the display controller 110, the bridge chip 120, and/or the processor 130.

The storage medium 620 is, for example, any type of fixed or removable random access memory (RAM), read-only memory (ROM), flash memory, hard disk drive (HDD), solid state drive (SSD), or similar components or combinations of the above components, and is configured to store multiple modules or various application programs that may be executed by the processor 610.

The transceiver 630 transmits or receives signals in a wireless or wired manner. The transceiver 630 may further perform operations such as low noise amplification, impedance matching, mixing, up or down frequency conversion, filtering, amplification, and similar operations.

Figure 7:
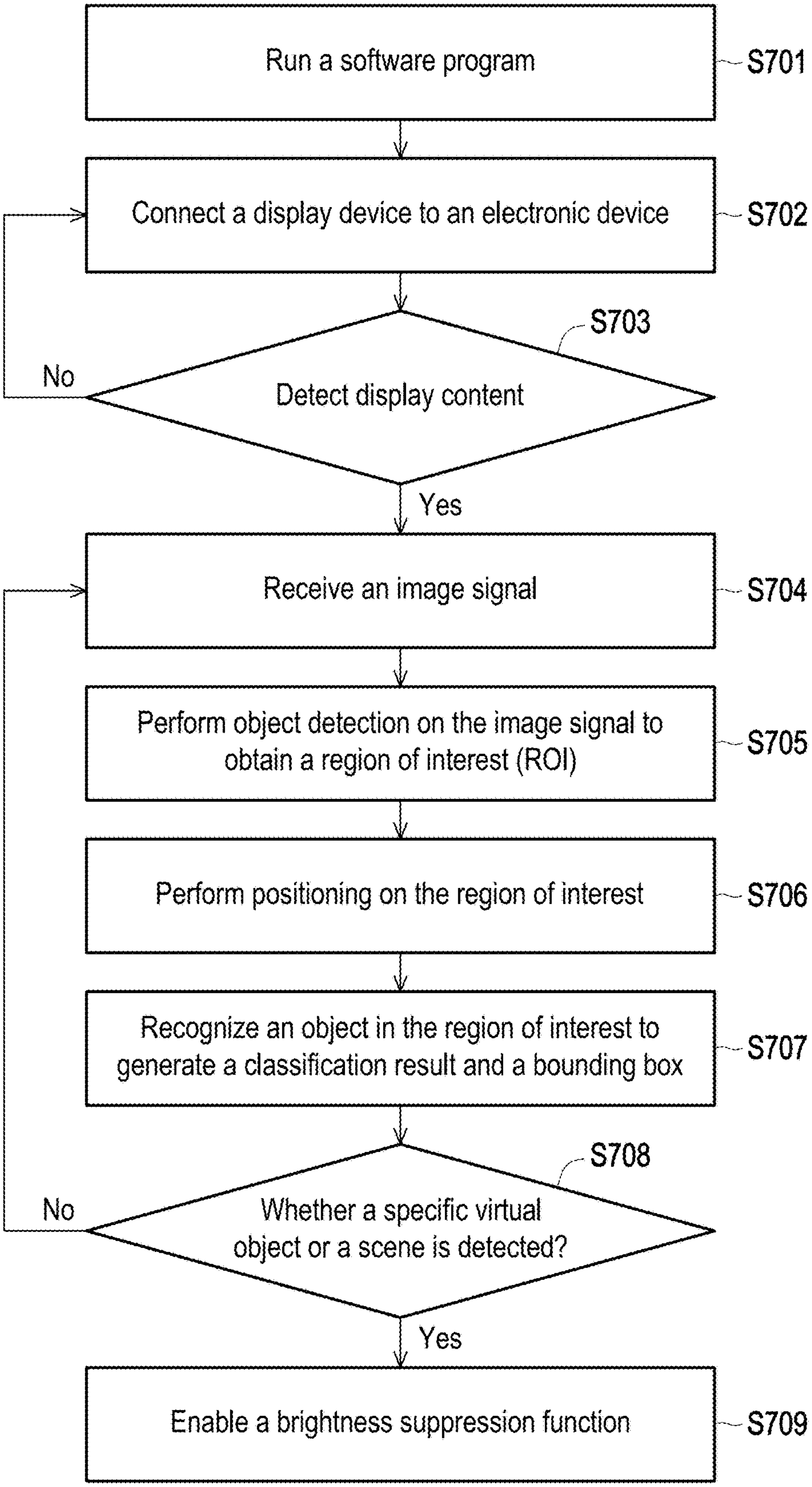
FIG. 7 illustrates a flowchart of enabling the brightness suppression function of the display device according to an embodiment of the disclosure.

FIG. 7 illustrates a flowchart of enabling the brightness suppression function of the display device according to an embodiment of the disclosure, in which the process in FIG. 7 may be applied to the electronic device 600. In Step S701, the processor 610 may receive a user command through the transceiver 630 to run the software program of the disclosure.

In Step S702, the user may connect the input port and output port of the display device (for example, the display device 100) to the transceiver 630 of the electronic device 600, in which the transceiver 630 may support communication protocols such as USB, HDMI, or DP.

In Step S703, the software program may detect the display content of the display device. If the software program does not detect the display content of the display device, it is indicated that the display device and the electronic device 600 may not have successfully established communication connection with each other. Accordingly, the software program may output a message through the transceiver 630 to instruct the user to re-execute Step S702 through the message. If the software program successfully detects the display content of the display device, then the operation proceeds to Step S704.

In Step S704, the software program may receive an image signal from the display device through the transceiver 630, in which the image signal may include a game screen of a game application program. In an embodiment, if the game application program is run by the electronic device 600, the software program may also directly obtain the image signal from the game application program run by the processor 610.

In Step S705 to Step S707, the software program may use a machine learning model to perform object recognition on the game screen to obtain a recognition result. The machine learning model used by the software program includes, for example, R-CNN. Step S705 to Step S707 are substantially the same as Step S203 to Step S205 in FIG. 2, so details will not be repeated here.

In Step S708, the processor 610 may determine whether a specific virtual object (for example, the virtual object 30) or scene is detected according to the recognition result. If the processor 610 determines that a specific virtual object or scene is detected, then in Step S709, the processor 610 may enable the brightness suppression function of the display device (for example, the display device 100). On the other hand, if the processor 610 determines that no specific virtual object or scene is detected, then the processor 610 may re-execute Step S704 after a period of time.

In an embodiment, the processor 610 of the electronic device 600 may detect whether a specific application program is executed. For example, the processor 610 may detect whether the processor 610 is executing a game application program of a shooting game. If the processor 610 detects that a specific application program is being executed, then the processor 610 may enable the brightness suppression function of the display device.

Figure 8:
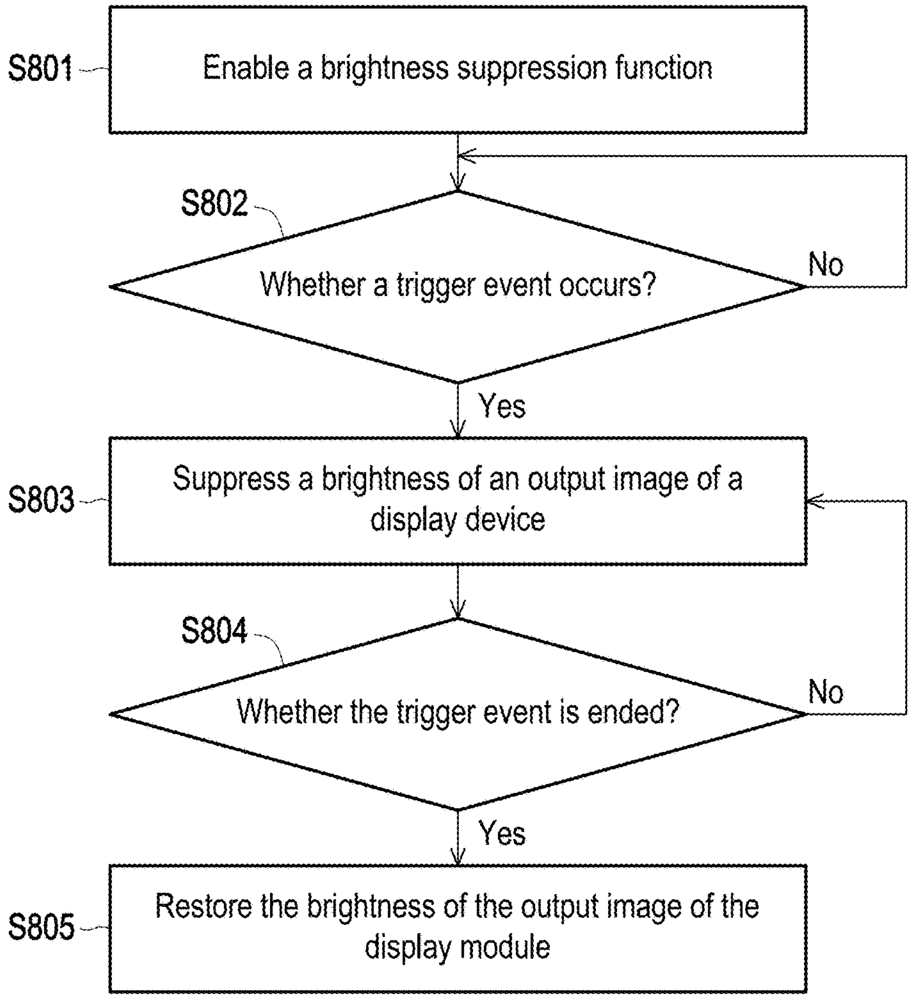
FIG. 8 illustrates a process of the brightness suppression function of the display device according to an embodiment of the disclosure.

FIG. 8 illustrates a process of the brightness suppression function of the display device according to an embodiment of the disclosure, in which the process in FIG. 8 may be applied to the electronic device 600. In Step S801, the electronic device 600 enables the brightness suppression function of the display device (for example, the display device 100).

In Step S802, the processor 610 may start to detect the image signal received by the transceiver 630. The processor 610 may detect the image signal to generate the detection result, and determine whether a trigger event occurs according to the detection result. The trigger event includes, for example, a virtual character controlled by the user being attacked by a flashbang in the game application program. If the processor 610 determines that a trigger event occurs, then the process proceeds to Step S803. If the processor 610 determines that no trigger event occurs, then the processor 610 may re-execute Step S802 after a period of time.

In an embodiment, the processor 610 may input the image signal to a machine learning model to generate the detection result indicating occurrence or non-occurrence of a trigger event. Specifically, the processor 610 may train the machine learning model according to multiple pieces of training data, in which the machine learning model is, for example, a regional convolutional neural network. In an embodiment, the training data may include images of virtual characters in shooting games being attacked or not being attacked by flashbangs, and may include labels indicating whether the virtual characters in the images are attacked by flashbangs.

In an embodiment, the processor 610 may calculate average color parameter of the image signal, in which the average color parameter includes, for example, an average of color parameters corresponding to one or more pixels (or one or more display regions) of the image signal. The color parameters include, for example, RGB values. After obtaining the average color parameter of the image signal, the processor 610 may compare the average color parameter with a threshold to generate the detection result indicating occurrence or non-occurrence of a trigger event. For example, if the average color parameter of the image signal is greater than the threshold, then the processor 610 may generate the detection result indicating occurrence of a trigger event. If the average color parameter of the image signal is less than or equal to the threshold, then the processor 610 may generate the detection result indicating non-occurrence of a trigger event.

In Step S803, the processor 610 may suppress the brightness of the output image of the display device according to the detection result, in which the output image is generated by the display device according to the image signal.

In Step S804, the processor 610 may detect the image signal to determine whether the trigger event is ended. If the processor 610 determines that the trigger event is ended, then the process proceeds to Step S805. If the processor 610 determines that the trigger event is not ended, then the processor 610 may re-execute Step S803 to continuously suppress the brightness of the output image of the display device.

In an embodiment, the processor 610 may input the image signal to a machine learning model to generate the detection result indicating whether the trigger event is ended. Specifically, the processor 610 may train the machine learning model according to multiple pieces of training data, in which the machine learning model is, for example, a regional convolutional neural network. In an embodiment, the training data may include images of virtual characters in shooting games being attacked or not being attacked by flashbangs, and may include labels indicating whether the virtual characters in the images are attacked by flashbangs.

In an embodiment, the processor 610 may compare the average color parameter with a threshold to generate the detection result indicating whether the trigger event is ended. For example, if the average color parameter of the image signal is less than or equal to the threshold, then the processor 610 may generate the detection result indicating that the trigger event is ended. If the average color parameter of the image signal is greater than the threshold, then the processor 610 may generate the detection result indicating that the trigger event is not ended.

In Step S805, the processor 610 may restore the brightness of the output image of the display device, that is, the processor 610 may stop suppressing the brightness of the output image of the display device.

Figure 9:
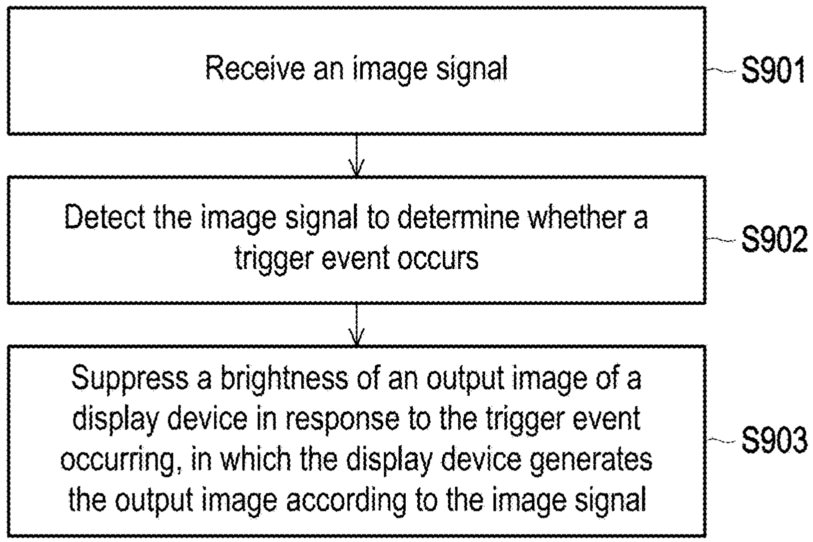
FIG. 9 illustrates a flowchart of a method for suppressing the brightness of the display device according to an embodiment of the disclosure.

FIG. 9 illustrates a flowchart of a method for suppressing the brightness of the display device according to an embodiment of the disclosure, in which the method may be implemented by the display device 100 as shown in FIG. 1 or the electronic device 600 as shown in FIG. 6. In Step S901, An image signal is received. In Step S902, the image signal is detected to determine whether a trigger event occurs. In Step S903, in response to the trigger event occurring, the brightness of the output image of the display device is suppressed, in which the display device generates the output image according to the image signal.

In summary, the device of the disclosure may enable on or disable the function for suppressing the brightness of the display device based on the operation command from the user on the on-screen display interface or based on the image recognition result of the game screen. When the function is enabled, the device may detect the image signal to determine whether a trigger event such as being attacked by a flashbang occurs. If a trigger event occurs, then the device may suppress the brightness of the display device, thereby reducing negative impact caused by flash visual effects on users.

What is claimed is:

1. A display device, comprising:

a display module;

a bridge chip receiving an image signal;

a processor electrically connected to the bridge chip; and a display controller electrically connected to the processor and the display module, wherein the processor detects the image signal to determine whether a trigger event occurs, wherein after the trigger event occurs at a first time point, a brightness of an output image of the display module increases from a first brightness to a second brightness during a period from the first time point to a second time point, in response to the trigger event occurring, the display controller suppresses the brightness of the output image of the display module, the brightness of the output image is suppressed and reduced from the second brightness to a third brightness during a period from the second time point to a third time point, the third brightness is greater than the first brightness, and wherein after the trigger event ends at the third time point, the brightness of the output image of the display device recovers from the third brightness to the first brightness, wherein the display controller generates the output image according to the image signal.

2. The display device according to claim 1, wherein the processor inputs the image signal to a machine learning model to generate a detection result, wherein the processor determines whether the trigger event occurs according to the detection result.

3. The display device according to claim 1, wherein the processor compares an average color parameter of the image signal with a threshold to generate a detection result, wherein the processor determines whether the trigger event occurs according to the detection result.

4. The display device according to claim 3, wherein in response to the average color parameter being greater than the threshold, the processor generates the detection result indicating occurrence of the trigger event.

5. The display device according to claim 1, wherein the display module outputs an on-screen display interface, wherein the processor detects the image signal according to an operation command corresponding to the on-screen display interface.

6. The display device according to claim 1, wherein the processor performs object recognition on the image signal to obtain a recognition result, and detects the image signal according to the recognition result.

7. The display device according to claim 6, wherein the processor performs object recognition by using a regional convolutional neural network, wherein the regional convolutional neural network comprises a region proposal network.

8. The display device according to claim 1, wherein the processor detects the image signal to determine whether the trigger event is ended, wherein in response to the trigger event ending, the display controller stops suppressing the brightness of the output image.

9. An electronic device for suppressing a brightness of a display device, comprising:

a transceiver communicatively connected to the display device; and a processor electrically connected to the transceiver, and configured to:

receive an image signal through the transceiver;

detect the image signal to determine whether a trigger event occurs, wherein after the trigger event occurs at a first time point, a brightness of an output image of the display device increases from a first brightness to a second brightness during a period from the first time point to a second time point; and in response to the trigger event occurring, suppress the brightness of the output image of the display device, the brightness of the output image is suppressed and reduced from the second brightness to a third brightness during a period from the second time point to a third time point, the third brightness is greater than the first brightness, and wherein after the trigger event ends at the third time point, the brightness of the output image of the display device recovers from the third brightness to the first brightness, wherein the display device generates the output image according to the image signal.

10. The electronic device according to claim 9, wherein the processor inputs the image signal to a machine learning model to generate a detection result, and determines whether the trigger event occurs according to the detection result.

11. The electronic device according to claim 9, wherein the processor compares an average color parameter of the image signal with a threshold to generate a detection result, and determines whether the trigger event occurs according to the detection result.

12. The electronic device according to claim 11, wherein in response to the average color parameter being greater than the threshold, the processor generates the detection result indicating occurrence of the trigger event.

13. The electronic device according to claim 9, wherein the processor detects whether an application program is executed, wherein in response to the application program being executed, the processor detects the image signal.

14. The electronic device according to claim 9, wherein the processor performs object recognition on the image signal to obtain a recognition result, and detects the image signal according to the recognition result.

15. The electronic device according to claim 14, wherein the processor performs object recognition by using a regional convolutional neural network, wherein the regional convolutional neural network comprises a region proposal network.

16. The electronic device according to claim 9, wherein the processor detects the image signal to determine whether the trigger event is ended, wherein in response to the trigger event ending, the processor stops suppressing the brightness of the output image.

17. A method for suppressing a brightness of a display device, comprising:

receiving an image signal;

detecting the image signal to determine whether a trigger event occurs, wherein after the trigger event occurs at a first time point, a brightness of an output image of the display device increases from a first brightness to a second brightness during a period from the first time point to a second time point; and in response to the trigger event occurring, suppressing the brightness of the output image of the display device, the brightness of the output image is suppressed and reduced from the second brightness to a third brightness during a period from the second time point to a third time point, the third brightness is greater than the first brightness, and wherein after the trigger event ends at the third time point, the brightness of the output image of the display device recovers from the third brightness to the first brightness, wherein the display device generates the output image according to the image signal.

* * * * *